M. EVERHART.
Wind-Wheel.

No. 201,400. Patented March 19, 1878.

WITNESSES:

INVENTOR:
M. Everhart.
BY Munn & Co
ATTORNEYS.

UNITED STATES PATENT OFFICE.

MARTIN EVERHART, OF VICTORIA, TEXAS.

IMPROVEMENT IN WIND-WHEELS.

Specification forming part of Letters Patent No. 201,400, dated March 19, 1878; application filed October 12, 1877.

*To all whom it may concern:*

Figure 1:
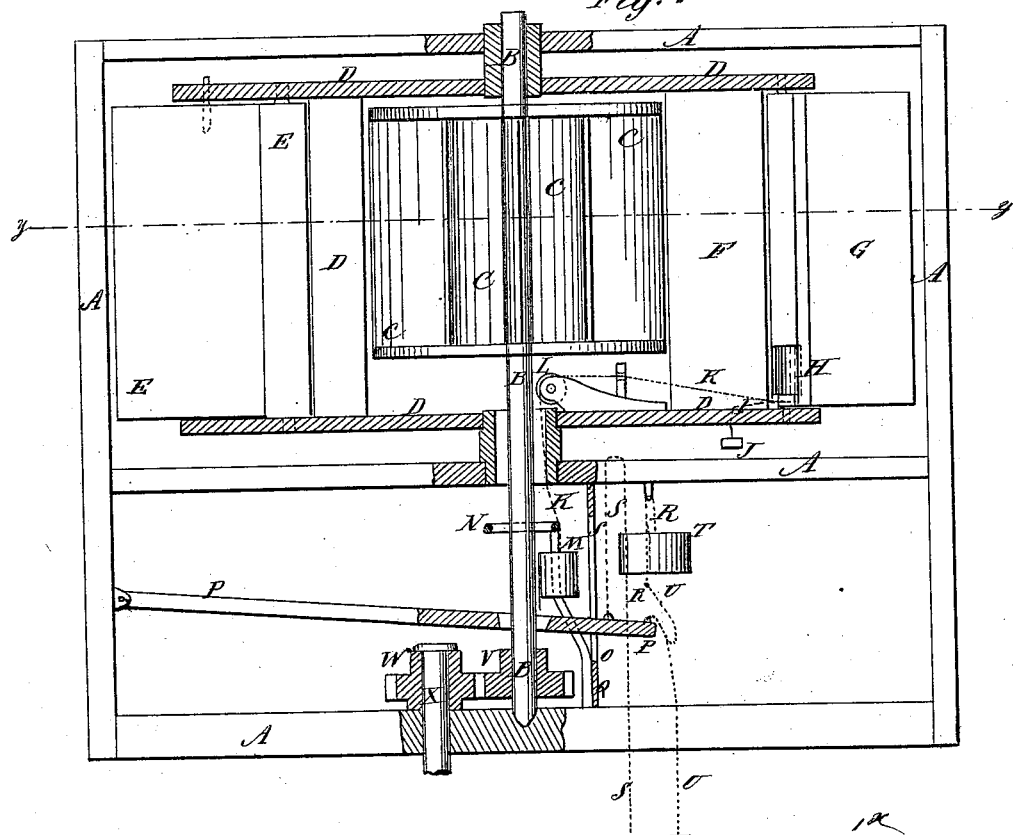
Figure 2:
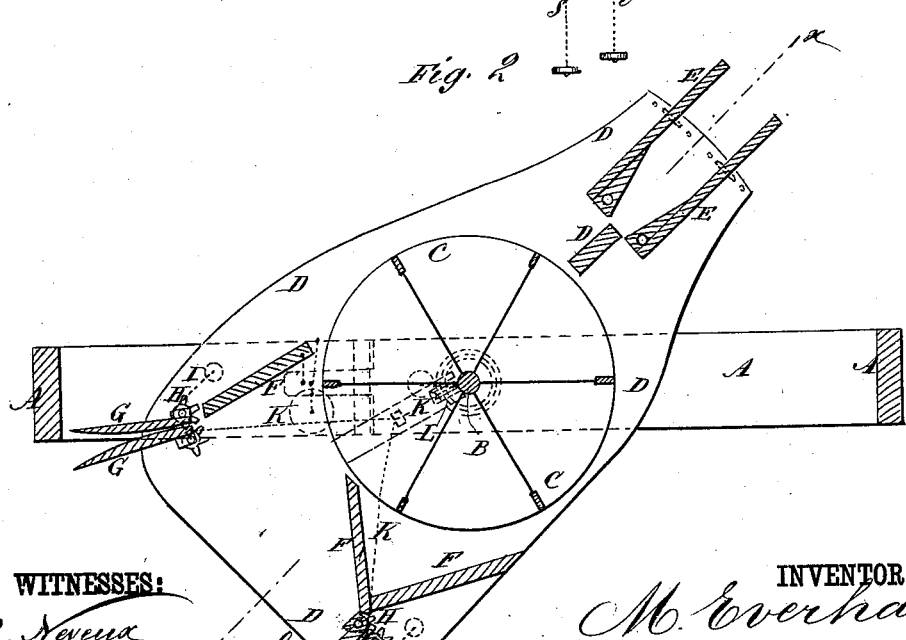

Be it known that I, MARTIN EVERHART, of Victoria, in the county of Victoria and State of Texas, have invented a new and useful Improvement in Wind-Wheels, of which the following is a specification:

Figure 1 is a side view of my improved wind-wheel, partly in section through the line *x x*, Fig. 2, parts being broken away to show the construction. Fig. 2 is a horizontal section of the same, taken through the line *y y*, Fig. 1.

Similar letters of reference indicate corresponding parts.

The object of this invention is to furnish an improved wind-wheel which shall be so constructed as to adjust itself to the force of the wind, and shut it off from the wind should the wind increase to a storm, which may be readily thrown into and out of the wind by hand, when desired, and which shall be simple in construction and not liable to get out of order.

The invention consists in the pivoted frame, the pair of adjustable rudders, the two pairs of adjustable wings, and the guide-aprons with the wind-wheel, the shaft, and the supporting-frame; and in the combination of the system of cords and weights, the hinged bar, and the segmental gear-wheels with the pairs of adjustable wings, the pivoted frame, and the supporting-frame, as hereinafter fully described.

A represents a frame, which is attached to a tower, roof, or other support, and in bearings in the middle part of which revolves the wheel-shaft B. To the upper part of the shaft B is attached the wheel C, which is formed by attaching radial wings at their ends to two disks.

D is a frame, which revolves upon hollow gudgeons, attached to the top and middle horizontal bars of the frame A, and through which the shaft B passes.

The wheel C and the frame D thus revolve about the same axis, but are entirely independent of each other. The top and bottom bars of the frame D are made wide at their forward ends, and narrower at their rear ends.

To and between the top and bottom bars of the frame D, upon the opposite sides of, and equally distant from, the central longitudinal line of said bars, and at a little distance from their rear ends, are pivoted the inner edges of two vanes or rudders, E. The rudders E may be adjusted parallel with each other, or one or both may be inclined outward, or one or both may be inclined inward, or one may be inclined outward and the other inward, as may be desired, so that the wheel may be held fully or partly in the wind, as may be required. The rudders E are held in place, when adjusted, by pins or staples passed through holes in the bars of the frame D at the sides of the said rudders E.

To the forward part of the top and bottom bars of the frame D are attached the ends of inclined boards F, which are so arranged, as shown in Fig. 2, as to guide the wind against the wings upon one side of the wheel C, and prevent it from blowing against the wings upon the other side.

To and between the top and bottom bars of the frame D, at the forward edges of the guide-boards F, are pivoted the inner edges of two pairs of wings, G, to the lower journals of which are attached, or upon them are formed, segmental gear-wheels H, the teeth of the wheels of each pair meshing into each other, so that the wings of each pair may open and close equally and at the same time. The wings G are made of such a size that when fully opened the outer edges of the inner wings may meet, and thus wholly shut the wind off from the wheel C. The movements of the wings G are limited by pins or blocks attached to the top bar of the frame D.

I is a cord, one end of which is wound around and attached to a journal of one of the wings G of each pair. The cord I passes through a hole in the bottom bar of the frame D, and to its lower end is attached a weight, J, of such a heaviness as to open the wings G, and hold them open to prevent them from flapping during an alternate calm and breeze, when the weight that holds them closed has been raised.

K is a cord, one end of which is wound around and attached to the journal of the other one of each pair of wings G. The cords K from the two pairs of wings G meet and form a single cord, which passes over a guide-pulley, L, pivoted to the bottom bar of the frame D, passes down through the cavity of the lower gudgeon of said frame D, and has a weight, M, attached to its lower end. The weight M is made of such a heaviness that when left free it will close the wings G and admit the wind to the wind-wheel. The cord K is held away from the shaft B, and kept from being wound around said shaft by a guard-ring, N, surrounding said shaft B, and supported from the frame A by an arm, O.

P is a bar or plate, through an elongated hole in which the shaft B passes, and which is hinged at one end to a post of the frame A. The forward end of the hinged bar P passes through a guide-slot in the post Q, attached to the lower and middle bars of the frame A.

To the forward end of the bar P are attached the ends of two cords, R S. The cord R passes over a guide-pulley attached to the middle bar of the frame A, and has a weight, T, heavier than the weight M, attached to its other end. To the cord R, between the bar P and the guide-pulley of the said cord R, is attached a cord, U, which extends down to and is connected with the machinery to be driven. The cord S passes over a guide-pulley attached to the middle bar of the frame A, and extends down into such position that it may be conveniently reached and operated by the attendant.

When the weight T hangs free it holds the bar P raised, and supports the weight M, allowing the weights J to hold the wings G open, so as to shut off the wind from the wheel C. When the weight T is raised by pulling down upon the cord U, the weight M moves downward, closing the wings G and admitting the wind to the wheel C. The weight M may be raised to open the wings G and admit wind to the wheel C by pulling down upon the cord S.

It will be observed that in opening and closing the wings G to stop and start the wheel C, all that is necessary is to start the said wings, as in the one case the wind will have an increasing power upon them and will open them instantly, and in the other case the wind will have a decreasing power upon them, so that a force that will start them will close them instantly.

To the lower part of the shaft B is attached a gear-wheel, V, the teeth of which mesh into the teeth of a gear-wheel, W, attached to the shaft X, from which motion is taken to the machinery to be driven.

Having thus described my invention, I claim as new and desire to secure by Letters Patent—

1. The pivoted frame D, the pair of adjustable rudders E, the two pairs of adjustable wings G, and the guide-aprons F, in combination with the wheel C, the shaft B, and the supporting-frame A, substantially as herein shown and described.

2. The combination of the system of cords and weights I J K M R T, the hinged bar P, and the segmental gear-wheels H with the pairs of adjustable wings G, the pivoted frame D, and the supporting-frame A, substantially as herein shown and described.

MARTIN EVERHART.

Witnesses:
GEORGE MALLORY,
ROBERT ALEXANDER SANFORD.